United States Patent [19]

Buck

[11] Patent Number: 4,674,904
[45] Date of Patent: Jun. 23, 1987

[54] APPLICATOR BRUSH FOR SELF SERVICE CAR WASH

[76] Inventor: James C. Buck, 269 Margaret St., Plattsburgh, N.Y. 12901

[21] Appl. No.: 766,552

[22] Filed: Aug. 19, 1985

[51] Int. Cl.⁴ .................... A46B 11/00; A46B 11/02; A46B 11/06

[52] U.S. Cl. .................... 401/268; 401/270; 401/278; 401/286; 401/289; 137/513.5; 137/59; 137/614.04

[58] Field of Search ............... 401/40, 268, 289, 279, 401/278, 290, 42–47, 270; 239/70, 289, 525, 526, 530, 588, 583, 586; 134/34, 42, 105; 137/59–62, 301, 614.04, 513.3, 513.5

[56] References Cited

U.S. PATENT DOCUMENTS

| | | | |
|---|---|---|---|
| 747,817 | 12/1903 | Wilke et al. | 137/614.04 |
| 851,999 | 4/1907 | Skellenger | 137/513.5 |
| 1,468,068 | 9/1923 | Hanson | 137/62 |
| 2,363,023 | 11/1944 | Stewart | 401/279 X |
| 2,731,656 | 1/1956 | Payne | 401/289 X |
| 2,948,479 | 8/1960 | Graceman | 239/588 X |
| 3,023,971 | 3/1962 | Milhous | 401/279 X |
| 3,103,312 | 9/1963 | Damrow | 239/304 X |
| 3,265,087 | 8/1966 | Livingston | 239/588 X |
| 3,377,123 | 4/1968 | Leeson | 401/278 |
| 3,420,252 | 1/1969 | Stroble | 137/59 |
| 3,422,827 | 1/1969 | McCulloch | 239/588 X |
| 3,468,337 | 9/1969 | Smirl | 137/513.5 X |
| 4,512,814 | 4/1985 | Buck | 134/34 |

FOREIGN PATENT DOCUMENTS

| | | | |
|---|---|---|---|
| 129491 | 10/1948 | Australia | 401/279 |
| 582408 | 3/1932 | Fed. Rep. of Germany | 401/278 |
| 23542 | 9/1949 | Finland | 401/278 |
| 856637 | 6/1939 | France | 401/279 |
| 2519881 | 1/1982 | France | 239/526 |
| 0118379 | 7/1983 | Japan | 137/59 |
| 126844 | 10/1949 | Sweden | 401/289 |
| 425828 | 10/1974 | U.S.S.R. | 401/289 |

Primary Examiner—Steven A. Bratlie
Attorney, Agent, or Firm—Bruns and Wall

[57] ABSTRACT

A brush for use in a self service car wash having an applicator head containing cleaning bristles and an elongated tubular handle adapted to bring wash fluids to the head. A relief valve is positioned in the handle which is designed to open when the fluid pressure in the handle exceeds a given value. A control valve is located between the relief valve and automatic fluid dispensing equipment for delivering fluids to the brush during a wash cycle. A bypass is provided in the control valve that permits water to drain into the handle when the control valve is closed, as for example between wash cycles. Pressure thus builds up in the handle behind the relief valve whereupon the valve periodically opens to relieve the pressure.

6 Claims, 3 Drawing Figures

U.S. Patent    Jun. 23, 1987    4,674,904
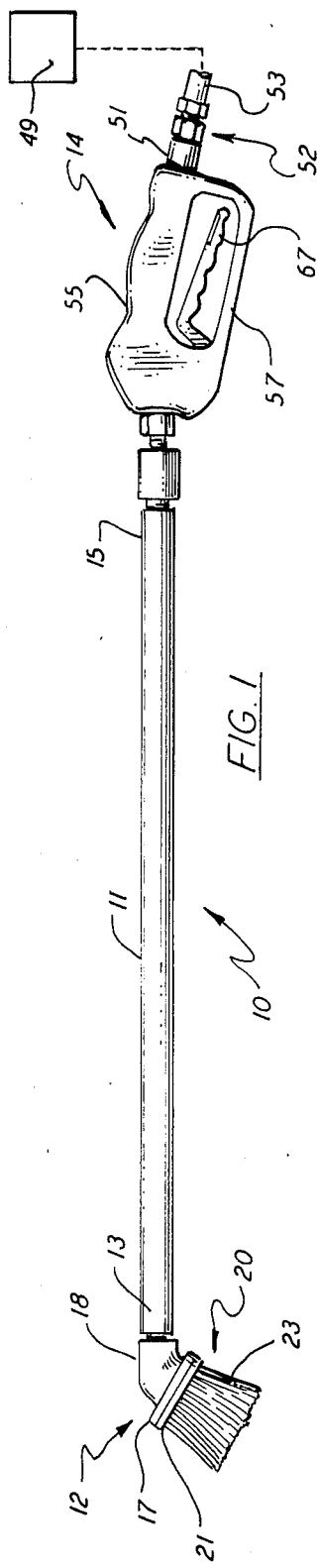
FIG. 1
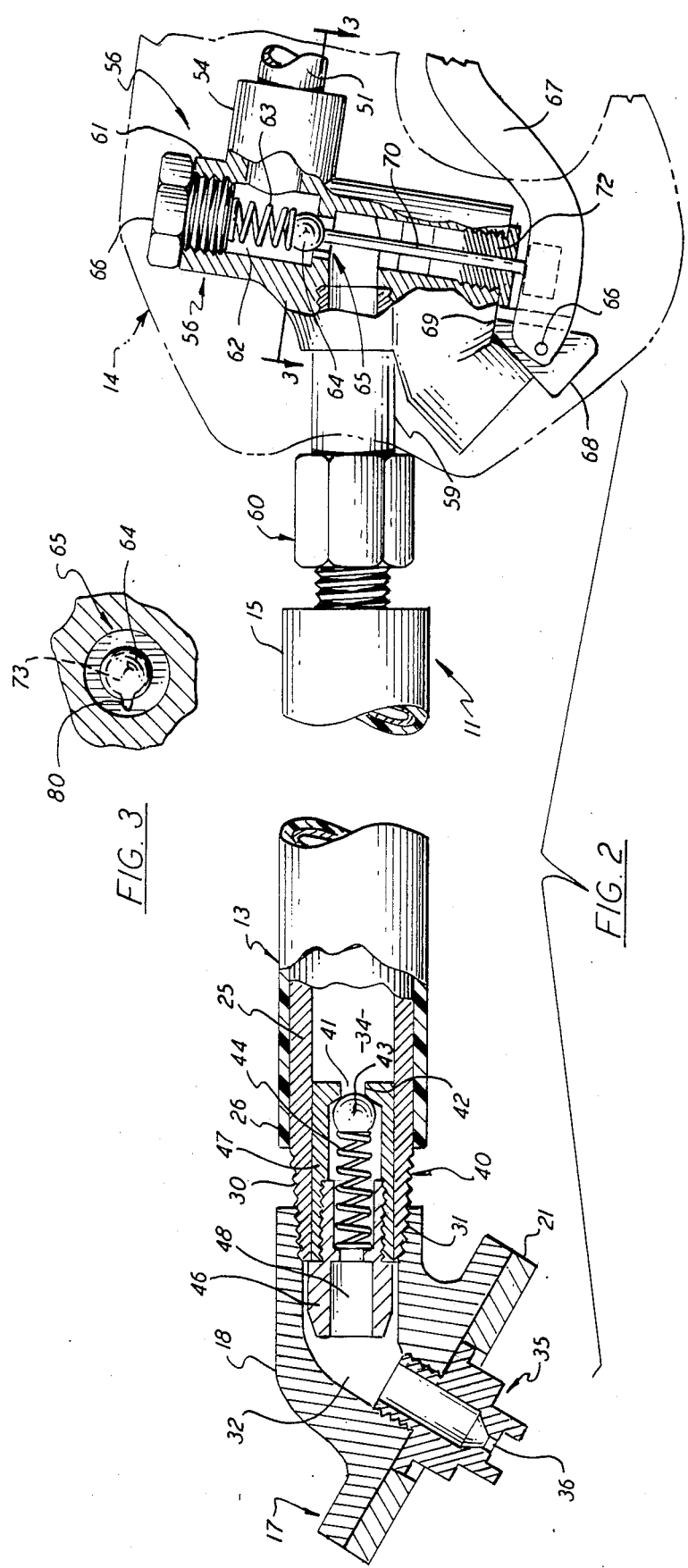
FIG. 2
FIG. 3

APPLICATOR BRUSH FOR SELF SERVICE CAR WASH

BACKGROUND OF THE INVENTION

This invention relates to a brush for washing motor vehicles and, in particular, to a brush that is suitable for use in a self service car wash particularly during cold weather operations.

As set forth in U.S. Pat. No. 4,512,814, customers utilizing a self service car wash typically can select one of many available wash programs. After depositing the appropriate amount of money, the automatic dispensing apparatus delivers water and other additives including soap and/or finish protectants, in an ordered sequence, to a long handled applicator sometimes referred to as a "wand". The wand is oftentimes equipped with a brush that is used to distribute wash fluids over the surface of the vehicle and, simultaneously therewith, loosen dirt and other types of soils clinging to the surface so that they can be easily washed away by a high pressure water rinse cycle.

The dispensing equipment used in most car washes is usually stored in open bays which are exposed to the elements. During cold weather, it is difficult to keep the equipment in good operating order because the brush fibers become heavily contaminated with road salt and dirt which, scratch and/or abrade the finish surface of the vehicle. Furthermore, the brush bristles, once wetted, will freeze at low temperatures thus rendering the brush unusable for all practical purposes. Although many of the brush related problems associated with cold weather operations have been eliminated by the heated trough disclosed in the above noted patent, the dispensing equipment used to sequence the wash fluids to the wand will also become frozen when left idle for any significant period of time.

Accordingly, it has been the practice within the industry to adjust the automatic dispensing equipment during cold weather so that a continuous low level flow of water runs through the equipment between wash programs. This continuous flow, in order to successfully combat low temperatures, can wastes an appreciable amounts of water. This practice is both wasteful and expensive and, in certain areas where water is becoming scarce, might eventually be prohibited. Furthermore, patrons of self service car washes have now discovered that this continuous, yet relatively low, flow of water through the equipment can be cleverly manipulated by various means so that vehicles can be washed without paying the required service charge.

SUMMARY OF THE INVENTION

It is therefore an object of the present invention to improve self service car washes.

It is a further object of the present invention to conserve the amount of water used in a self service car wash particularly during cold weather.

A still further object of the present invention is to protect the equipment found in a self service car wash from freezing temperatures.

Yet a further object of the present invention is to prevent the unauthorized use of a coin operated car wash.

These and other objects of the present invention are attained by means of a cleaning brush suitable for use in a outdoor self service car wash wherein the automatic dispensing equipment is exposed to relatively low temperatures. The cleaning brush includes an applicator head having a centrally located hole passing between the top and bottom surfaces thereof. Soft pliable bristles are outwardly extended from the bottom surface of the head and an elongated hollow handle is secured at one end to its top surface so that the passage in the handle communicates with the hole passing through the head. A spray nozzle is mounted in the head to direct fluid passing through the handle outwardly through the brush bristles. The other end of the handle is connected to automatic equipment for dispensing wash fluids in a programmed sequence. A relief valve is mounted in the brush handle downstream from a manually operated control valve. The relief valve is set so that it remains open during a wash sequence but will close when the sequence is completed. The control valve is equipped with a bypass that allows a metered amount of water to enter the handle behind the relief valve between wash sequences so that the relief valve will periodically open for a short period of time to drain the system behind the relief valve. The relief valve then closes and will remain closed until such time as sufficient pressure builds up in the handle to initiate a new drain cycle.

BRIEF DESCRIPTION OF THE DRAWINGS

For these and other objects of the present invention reference is had to the following detailed description of the invention which is to be read in conjunction with the accompanying drawings wherein:

FIG. 1 is a side elevation of a long handled brush embodying the teachings of the present invention;

FIG. 2 is an enlarged partial view in section of the brush shown in FIG. 1 further illustrating the internally mounted control mechanisms associated therewith; and FIG. 3 is a section taken along lines 3—3 in FIG. 2.

BRIEF DESCRIPTION OF THE INVENTION

Referring now to the drawings, the present brush, generally referenced 10, includes an elongated tubular handle assembly 11 having an applicator head 12 secured to the distal end 13 of the handle and a hand grip 14 secured to its proximal end 15. The applicator head includes a flat metal base plate 17 having a centrally located neck 18 that is turned outwardly at an angle of about 240° from the top plannar surface of the plate. A bristle unit 20 is secured by any suitable means to the bottom surface of the base plate. The unit contains a flat substrate 21 whose periphery complements that of the base plate and a series of soft pliable bristles 23 outwardly disposed from the substrate. The bristles are of equal length and can be formed of any suitable natural or synthetic material that is generally impervious to fluids and which can be used to dislodge and clean soils and other contaminants from the surface of a motor vehicle without abrading or otherwise marring the finish of the surface.

The handle 11 of the brush consists of a hollow cylinder 25 made of a rust resistant metal and an outer protective sleeve 26 formed of platic. Preferably the outer sleeve is formed of a heat shrinkable material that can be easily slipped over the metal tube and then heated to shrink fit the sleeve to the tube to complete the assembly. The distal end of the metal tube is provided with a male thread 30 that is adapted to mate with a female thread 31 contained in a goose-neck shaped conduit 32 passing through both the base plate 17 and the substrate 21. In assembly, the conduit 32 is placed in fluid flow communication with an axially disposed passage 34 contained within the handle. As best illustrated in FIG. 2, a spray nozzle 35 is threaded into the bottom opening of the conduit. The nozzle contains a restricted exit 36 that is adapted to direct fluids passing through the handle into a stream that generally parallels the bristles 23 (FIG. 1).

A relief valve, generally referenced 40, is threaded into the flow passage 34 at the distal end of tube 25. The relief valve has a restricted entrance 41 formed within a circular valve seat 42 that is adapted to receive valve ball 43. A closure spring 44 is positioned behind the ball within valve chamber 45. The spring is held in place by means of an end cap 46 that is threaded into the back of the valve housing 47. The end cap contains a discharge opening 48 for directing fluid passing through the relief valve into the conduit 32. As will be explained in greater detail below, the biasing pressure exerted by spring 44 normally holds the valve closed until such time as the fluid pressure contained within the handle passage 34 exceeds a predetermined value. The opening pressure of the valve, however, is sufficiently low so that it will not effect the operation of the equipment during a wash sequence.

A threaded connector 60 is located at the proximal end 15 of the handle. The connector serves to couple hand grip 14 to the handle assembly 11. An inlet line 51 extends from the back of the hand grip and has a coupling 52 operatively associated therewith for joining the brush assembly to the outlet fluid line 53 off automatic car wash dispensing equipment 49. As explained in previously noted U.S. Pat. No. 4,512,814, the fluid inlet to the brush is typically attached to a coin operated automatic machine which meters fluids in a preprogrammed sequence to the brush. The automatic equipment generally contains suitable mixing and sequencing valves along with high pressure and low pressure pumps for sequencing the fluids to the applicator brush. To the extent necessary to understand the operation of the present invention, the disclosure in the above noted patent is herein incorporated by reference.

As is well known in the art, when using this type of automatic equipment, the type of wash cycle desired is selected and the machine, once actuated, carries out a series of preprogrammed fluid dispensing sequences designed to clean and protect the finish of the vehicle. Typically, when the equipment is stored in outdoor bays during cold weather, a drain cycle is included between each programmed car wash cycle. During the drain cycle, water at low pressure is passed through the equipment to prevent the fluid contained within the equipment from freezing and thereby rendering the apparatus inoperative. As a consequence, a small but continuous stream of water is discharged from the apparatus when it is not in use. As noted above, this steady flow of water is not only costly but can create a serious problems when water is scarce.

The inlet line 51 runs through the top section 55 of hand grip 14 and discharges into the entrance 54 of a spring loaded control valve 56. The control valve is completely housed within the hand grip forward of the trigger guard 57. The exit 58 of the valve is connected directly into a line 59 which is attached to the proximal end of the handle by means of a threaded connector 60. The control valve 56 includes an elongated valve body 61 having an axially expended chamber 62 contained therein. A contoured valve seat 65 (FIG. 3) is formed in the housing which is adapted to receive a valve ball 64 therein. In assembly, the ball is held against the valve seat by means of a spring 63. The spring, as shown in FIG. 2, is loaded against the ball by means of an end cap 66 to retain the valve ball against its companion seat.

The positioning of the control valve 56 is regulated by means of a trigger 67 positioned inside the trigger guard 57. The left hand end of the trigger, as illustrated in FIG. 2, is pivotally mounted in the hand grip by means of a pivot pin 66 secured in a bracket 68. The trigger is equipped with an adjusting screw 75 that is arranged to abut against a stop surface 69 that is an integral part of the hand grip structure. An elongated valve stem 70 is mounted in the pivot end of the trigger directly beneath the valve body 61. The stem is passed upwardly into chamber 62 through a leak tight bushing 72 and the passage 73 formed in the valve seat. The end of the stem rests against the valve ball so that it is normally biased downwardly against the trigger under the influence of spring 63. The trigger is thus urged in a direction about the pivot so as to normally force the adjusting screw against the stop surface 69. In assembly, with the ball resting against the valve seat, the adjusting screw is used to bring the valve stem to a position just below or in light touching contact with the ball whereupon the valve ball will be securely seated in the valve seat when the trigger is arrested against the stop surface. Accordingly, rotating the trigger in a counterclockwise direction, as shown in FIG. 2, causes the stem to move the ball upwardly away from the valve seat thereby opening the valve. Through use of the trigger mechanism, the control valve can be selectively positioned between a fully opened and a fully closed position.

Turning now specifically to FIG. 3, there is shown in greater detail the valve seat 65 of the control valve 56 with the valve ball 64 shown positioned in the seat. The seat contains the main valve passage 73 centrally positioned therein. Intrical with the centrally located valve passage is a smaller slotted metering port 80 that extends radially beyond the periphery of the main passage 73. When the ball is positioned in contact against the valve seat, the main valve passage 73 is closed, however, the smaller metering port 80 remains open and thus allows a restricted amount of fluid to move around the valve. Accordingly, when the brush is not in use, a small amount of fluid will be metered about the control valve and allowed to enter the handle behind the relief valve. The size of the metering port is related to the biasing pressure of the relief spring so that the relief spring will periodically open as the pressure of the water metered around the control valve builds up behind the relief valve.

After a programmed wash cycle has been completed, the brush is typically returned to a storage rack awaiting the next washing program. Preferably, the rack will be of the type described in the previously noted U.S. Pat. No. 4,512,814, which is specifically designed to keep the brush bristles in good working order during cold and freezing weather. In addition, the automatic equipment is programmed to allow a small amount of water to pass through the system between wash cycles to prevent the water from becoming frozen inside the equipment. This drain cycle between washes is sometimes referred to as a "weep" cycle. During the drain cycle, the water is allowed to enter the brush handle through the slotted metering port contained in the control valve. The water pressure in the handle, builds up to a point where it eventually overcomes the holding pressure of the relief valve. At this time, the valve opens and a quantity of water behind the valve is discharged through the brush head. Once the pressure behind the valve has been relieved, the valve quickly closes and remains closed until the fluid pressure in the handle again builds up to a level sufficient to reopen the valve whereupon the cycle is repeated. In practice, the open period for the valve is relatively short in comparison to the shut-off period during the drain cycle. The shut-off period is short enough to prevent water from freezing in the equipment but long enough to conserve water and prevent unauthorized use of the equipment when a drain cycle has been initiated during cold weather.

While this invention has been described with specific reference to the detailed description set forth above, it is not confined to this specific structure and this application is intended to cover any modifications and changes that may come within the scope of the following claims.

I claim:

1. A cleaning brush for use in washing motor vehicles that includes
    an applicator head having a centrally located conduit passing therethrough and a series of outwardly extending bristles located adjacent the exit of said conduit,
    an elongated handle attached at one end to the head at the entrance to the conduit, said handle having an axial passage therethrough that communicates with said conduit,
    a normally closed relief valve positioned in said handle having a spring means for allowing the valve to open when the fluid pressure in the handle behind the valve exceeds a given level thereby discharging fluid in the handle through the valve port into the applicator head,
    a control valve at the oposite end of the handle, the control valve being selectively positionable between open and closed positions,
    means to connect the control valve to a fluid dispensing means whereby the control valve regulates the flow of dispensed fluids into the handle, and
    a constantly open metering port for metering a controlled flow of fluid around the control valve when said control valve is in a closed position, the area of said metering port being substantially less than the area of the control valve port, the metering port permitting port permitting fluid to fill the handle whereby the relief valve is caused to periodically open even though the control valve is maintained in a closed position.

2. The cleaning brush of claim 1 wherein the source of fluid is an automatic self service car washing apparatus that is adapted to deliver fluids to the cleaning brush in accordance with a preprogrammed sequence of operations.

3. The cleaning brush of claim 2 wherein the bias of the spring means of the relief valve is such that the relief valve remains open during each preprogrammed sequence of operation.

4. The cleaning brush of claim 1 that further includes a hand grip for enclosing the control valve, said hand grip further containing a manually actuated trigger for selectively moving the control valve between open and closed positions.

5. A cleaning brush for use in conjunction with automatically programmed self cleaning car wash equipment wherein fluids are dispensed in an ordered sequence through an output line, said cleaning brush including
    an applicator head having a series of outwardly extending bristles and a nozzle for spraying fluids through said bristles,
    a tubular handle secured at one end to the head, said handle having an axial passage therethrough that communicates with said nozzle,
    a relief valve positioned in said handle upstream of said nozzle, said relief valve having a discharge opening for passing fluid contained in said handle to said nozzle, said relief valve being arranged to automatically open at a given pressure,
    a hand grip assembly at the opposite end of the handle, said hand grip assembly being connected to the output line of the automatically programmed car washing equipment,
    a manually operated control valve that is movable between open and closed positions, said control valve being mounted in said hand grip assembly so that it is between the said output line of the automatic equipment and said relief valve, and
    bypass means having a constantly open metering port for routing fluids around the control valve when said control valve is in a closed position, the area of the metering port being substantially less than that of the valve opening in the control valve, the metering port permittig fluid to fill the handle and cause the relief valve to open even though the control valve is in a closed position,
    said control valve having a valve seat for receiving a valve closure element and said metering port being a radially disposed opening formed in the seat.

6. The cleaning brush of claim 5 wherein said nozzle is centrally located in the head and is arranged to spray fluid through said bristles in a stream that is parallel with said bristles.

* * * * *

UNITED STATES PATENT AND TRADEMARK OFFICE
CERTIFICATE OF CORRECTION

PATENT NO. :   4,674,904

DATED      :   June 23, 1987

INVENTOR(S) :  James C. Buck

It is certified that error appears in the above-identified patent and that said Letters Patent is hereby corrected as shown below:

In Column 5, line 47, after "permitting" delete "port permitting".

Signed and Sealed this

Twentieth Day of October, 1987

Attest:

DONALD J. QUIGG

Attesting Officer

Commissioner of Patents and Trademarks